(12) United States Patent
Leung

(10) Patent No.: US 6,357,342 B1
(45) Date of Patent: Mar. 19, 2002

(54) ELECTRIC COFFEE MAKER

(75) Inventor: Chi-Wah Leung, Hong Kong (HK)

(73) Assignee: Simatelex Manufactory Co., Ltd., Hong Kong (HK)

(*) Notice: Subject to any disclaimer, the term of this patent is extended or adjusted under 35 U.S.C. 154(b) by 0 days.

(21) Appl. No.: 09/659,226

(22) Filed: Sep. 11, 2000

(51) Int. Cl.[7] ................................................ A47J 31/00
(52) U.S. Cl. ............................ 99/279; 99/290; 99/304; 99/307; 248/317
(58) Field of Search ......................... 99/279, 290, 304, 99/305, 306, 307, 323.3; 211/1.52, 1.53, 1.54, 1.55, 115, 163, 164; 248/130, 317, 349.1, 131

(56) References Cited

U.S. PATENT DOCUMENTS

| | | | | |
|---|---|---|---|---|
| 4,008,656 A | * | 2/1977 | Gruner | 99/304 X |
| 4,630,532 A | * | 12/1986 | Sonnentag et al. | 99/279 |
| 4,728,281 A | * | 3/1988 | McGuffin et al. | 99/279 X |
| 5,765,796 A | * | 6/1998 | Lanus | 248/349.1 |

* cited by examiner

Primary Examiner—Reginald L. Alexander
(74) Attorney, Agent, or Firm—Jackson Walker L.L.P.

(57) ABSTRACT

An electric coffee maker is mounted on a platform which is rotatably supported by a frame that can be fixed by ears "under-a-cabinet" in a kitchen, above a worktop. The principal components (a carafe a water reservoir, and a filter holder are confined in a relatively small cylindrical cavity defined by the platform, the support frame, upstanding walls and arcuate slidable doors. Because the platform can be rotated either by an electric motor or manually, the components are easily accessible and removable out of 'front' of the cavity. Compared to known equivalent coffee makers, this coffee maker also requires considerably less space.

9 Claims, 7 Drawing Sheets

ELECTRIC COFFEE MAKER

BACKGROUND OF THE INVENTION

1. Field of the Invention

The invention relates to electric coffee makers.

2. Description of Prior Art

There are a number of types of electric coffee maker that depend upon having access to recharge the coffee maker with coffee grounds, to re-charge a water reservoir, and to remove a carafe to pour coffee into cups. It has already been proposed to design coffee makers that can be supported below a shelf or more typically under a kitchen cabinet so as not to take up space on a work top when in use.

This invention relates particularly to such so-called 'Under-the-cabinet' coffee makers, which are typically arranged having a housing for a water reservoir of the coffee maker to be positioned at one side of a brew basket and a carafe stand. This allows the parts to be withdrawn out of or be accessible from a front of the cabinet. This means that the housing must be at least the combined effective width of the reservoir and the carafe, say, otherwise access and removal of the parts is somewhat clumsey. As the depth 'under-the-cabinet' is usually greater than this combined width, it can result in loss of valuable space in the kitchen.

SUMMARY OF THE INVENTION

It is an object of the invention to overcome or at least reduce this problem.

According to the invention there is provided an under-the-cabinet coffee maker having principal components comprising a water reservoir, a filter holder and a carafe which are all confined within an effective periphery of and mounted on a horizontal platform and arranged such that these components can be accessible or removed horizontally with respects to the platform, and a support frame having a front side and arranged to be mounted to an underside of a cabinet for rotatably supporting the platform so that the coffee maker can be turned to allow a front access to the components in turn.

The under-the-cabinet coffee maker may include gears mechanically coupling the platform to the support frame.

An operating lever having a gear may be provided for engaging the gears arranged to rotate the platform relative to the support in one or other direction when level is manually swung through a horizontal arc to the left or to the right respectively.

An electric motor may be provided connected to the gears for turning the platform relative to the support frame.

The platform may have upstanding walls that partially surround the principle components.

The platform is preferably circular and the walls upstand from adjacent the periphery of the platform.

Arcuate closure doors for closing off a carafe cavity when the coffee maker is not in use may be provided, in which the doors are arcuate and slidable around respective outsides of the walls.

The under-the-cabinet coffee maker may include a part-annular shaped reservoir that fits at one side of the platform and has base with an outer surface that corresponds generally to the peripheral shape of the platform where it is supported.

Manually operable switches for the motor may be mounted to opposing exposed parts of the platform.

BRIEF DESCRIPTION OF THE DRAWINGS

An under-the-cabinet coffee maker according to the invention will now be described by way of example with reference to the accompanying drawings in which.

DESCRIPTION OF THE PREFERRED EMBODIMENT

Figure 1:
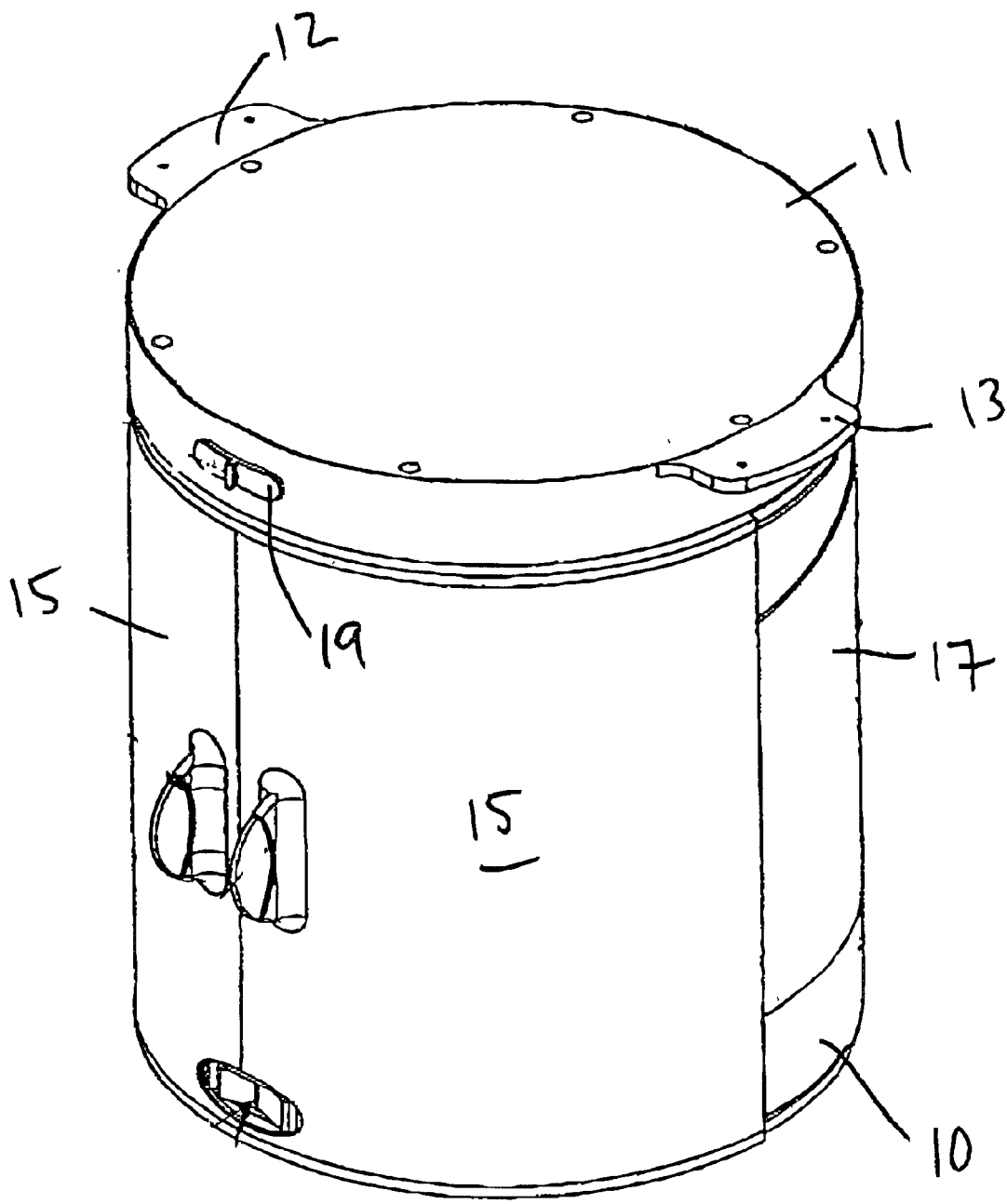
FIG. 1 is at front isometric view of the coffee maker.

Referring to the drawings, components of the coffee maker are generally designed and configured to lie within all overall circular perimeter defined by an area of a circular mounting platform 10 that is held up by a circular support frame 11. The platform can rotate with respect to the support frame. The. support frame 11 has two ears 12 and 13 through which fixing screws (not shown) can be fitted to attach the frame 11 against a horizontal under-surface of a cabinet or shelf in a kitchen. Thus, in use the coffee maker is normally mounted above and out of contact with a worktop, as desired, and operable from below a front -side of the cabinet.

As is apparent from FIGS. 1 to 4, the coffee maker is housed in an overall container (that is made up of the platform 10, the support frame 11, upstanding walls 14, and arcuate slidable doors 15) that has an overall diameter not insignificantly greater than a carafe 16 of the coffee maker. In other words, the carafe and other principle components, consisting of a part-annular shaped water reservoir 17 and a filter holder 18 (which could be a brewing basket, for example) fit snugly inside the container. By rotating the platform, each of the components is readily accessible and removable horizontally away from the platform in turn, so that in use access can always be provided from a "front" of the coffee maker. Generally stated therefore, coffee makers of the present invention take up a minimum of space while providing easy access required to make ready, operate and service the coffee maker.

Figure 2:
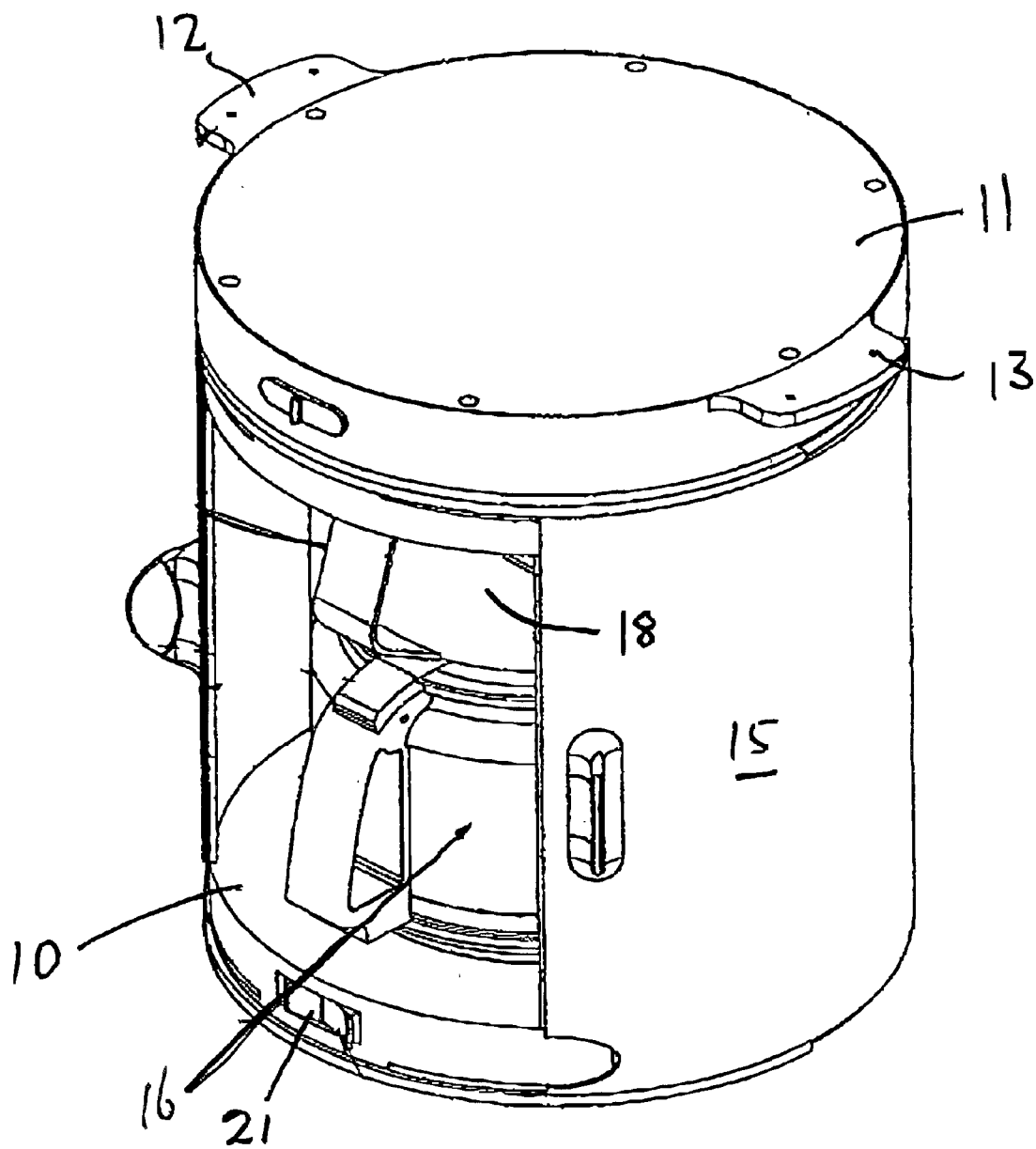
FIG. 2 is a view of FIG. 1 with closure doors open.
Figure 3:
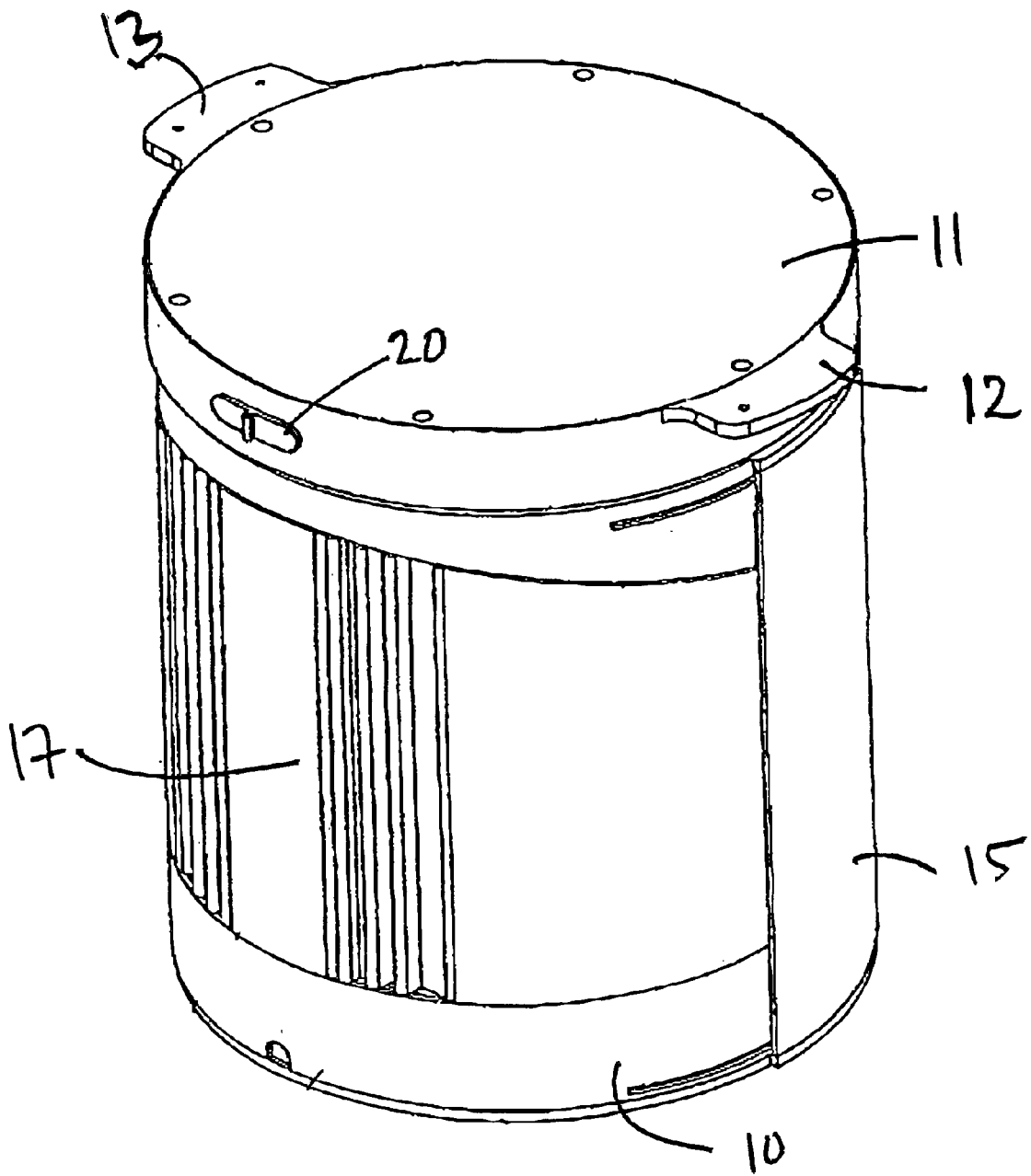
FIG. 3 is an isometric rear view of the coffee maker showing a water reservoir.
Figure 4:
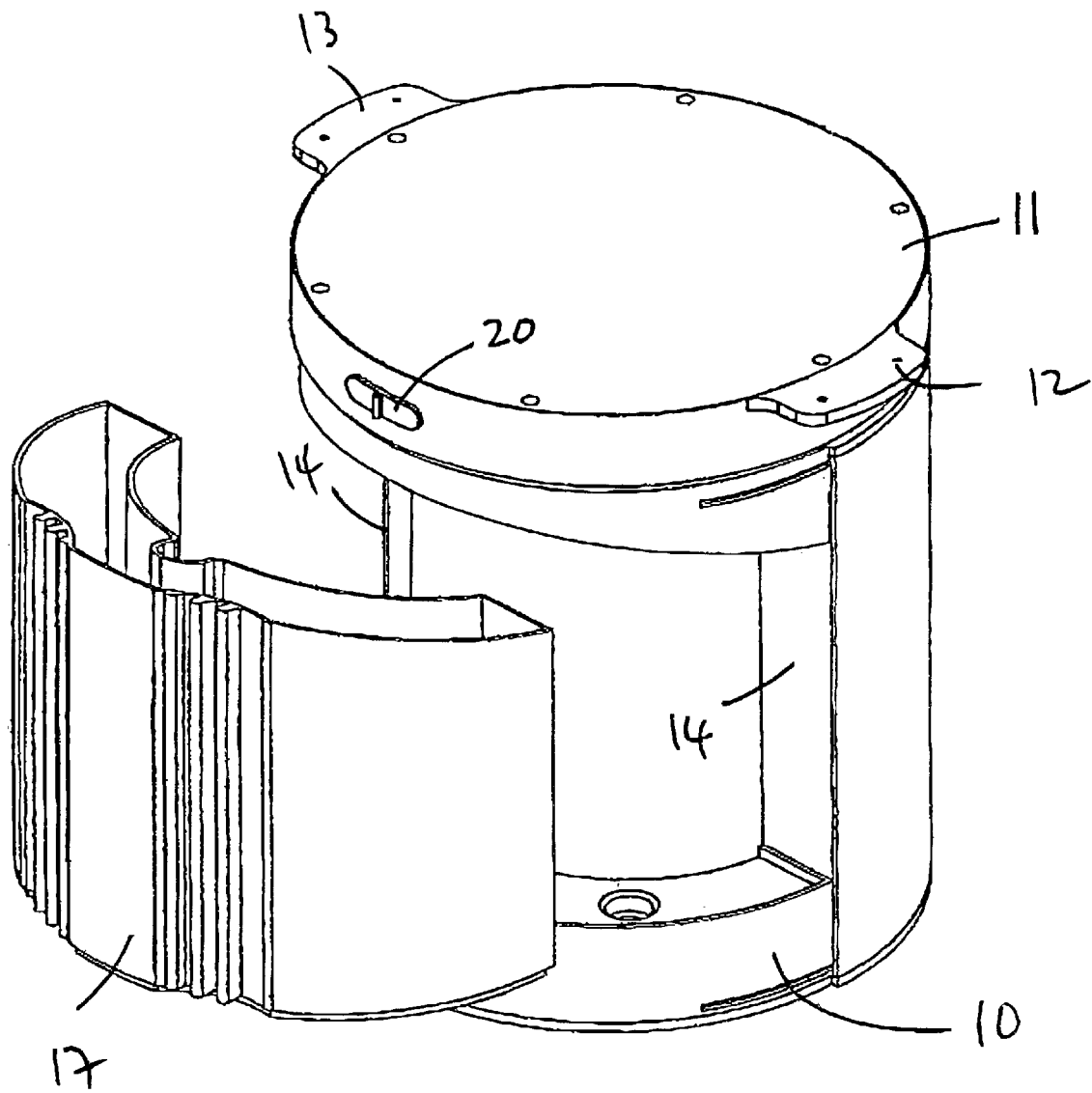
FIG. 4 is a view of FIG. 2 with the water reservoir removed.

FIGS. 1 and 2 show a 'rotate' switch 19 and FIG. 3 shows a rotate switch 20 which will be described later. A main power switch 21 for turning ON the coffee maker is mounted to an exposed surface of the platform 10.

Figure 5:
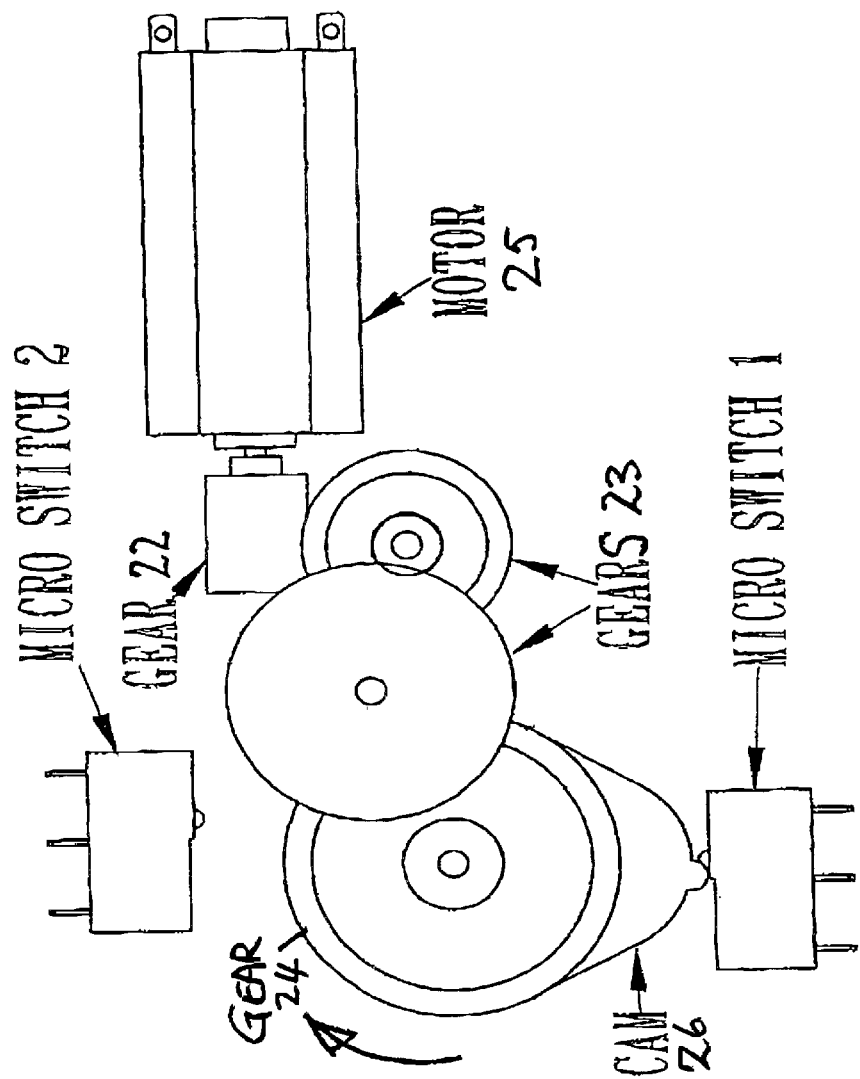
FIG. 5 is a diagrammatic top view of gears for the coffee maker and an electric motor.

In FIG. 5, gears 22, 23 and 24 are shown for rotating the platform 10 with respect to the support frame 11. A direct current electric motor 25 is fixed to the support frame 11 to drive the gears and turn the platform which is fixed for rotation to the gear 24. A cam 26 is formed on the gear 24. Microswitches 1 and 2 mounted to the support frame are used to automatically control operation of the motor by engagement by a remote end of the cam 26. Each time the motor is switched ON, the platform 10 is arranged to rotate by 180°.

Figure 6:
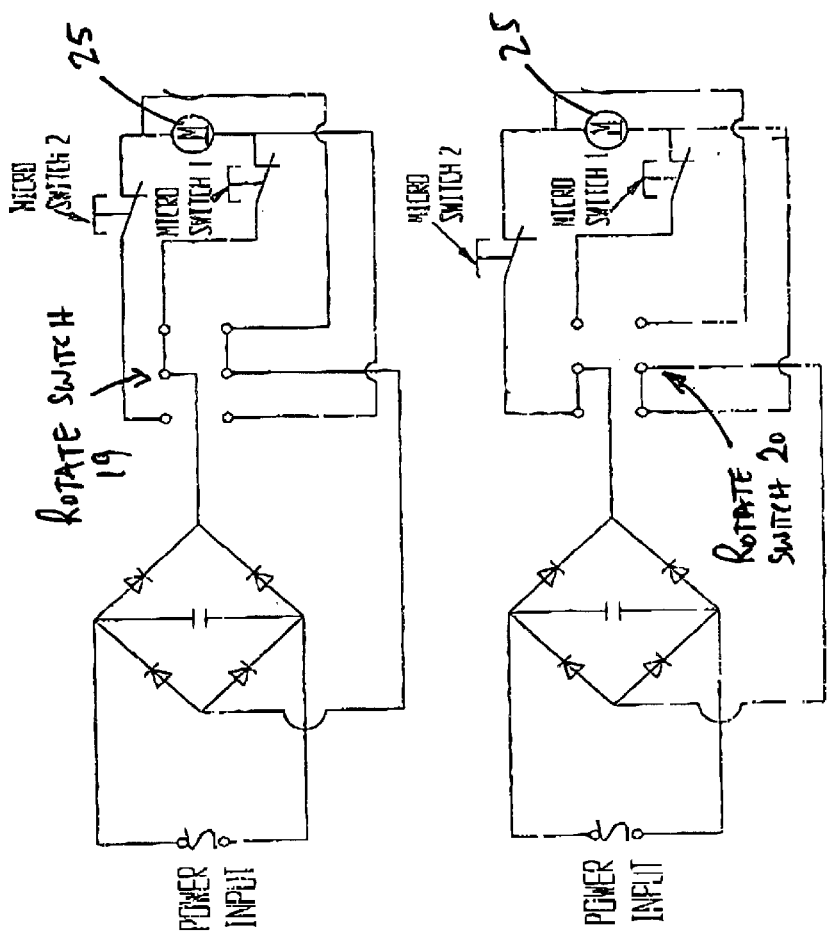
FIG. 6 are diagrams of circuits for operating the motor.

In FIG. 6, the circuit arrangements for controlling the motor is shown. The rotate switches 19 and 20 are selectively used to turn ON the motor. At any one time, one of the switches 19 and 20 will be presented for use at the "front" of the coffee maker. Thus, for example if the carafe is at the "back" of the coffee maker, the switch 20 will be at the front. In order to turn the coffee maker through 180°, to bring the carafe to the front, the switch 20 is operated, and so forth. The Figure shows two possible configurations of the rotate switches and the microswitches at any one time.

Figure 7:
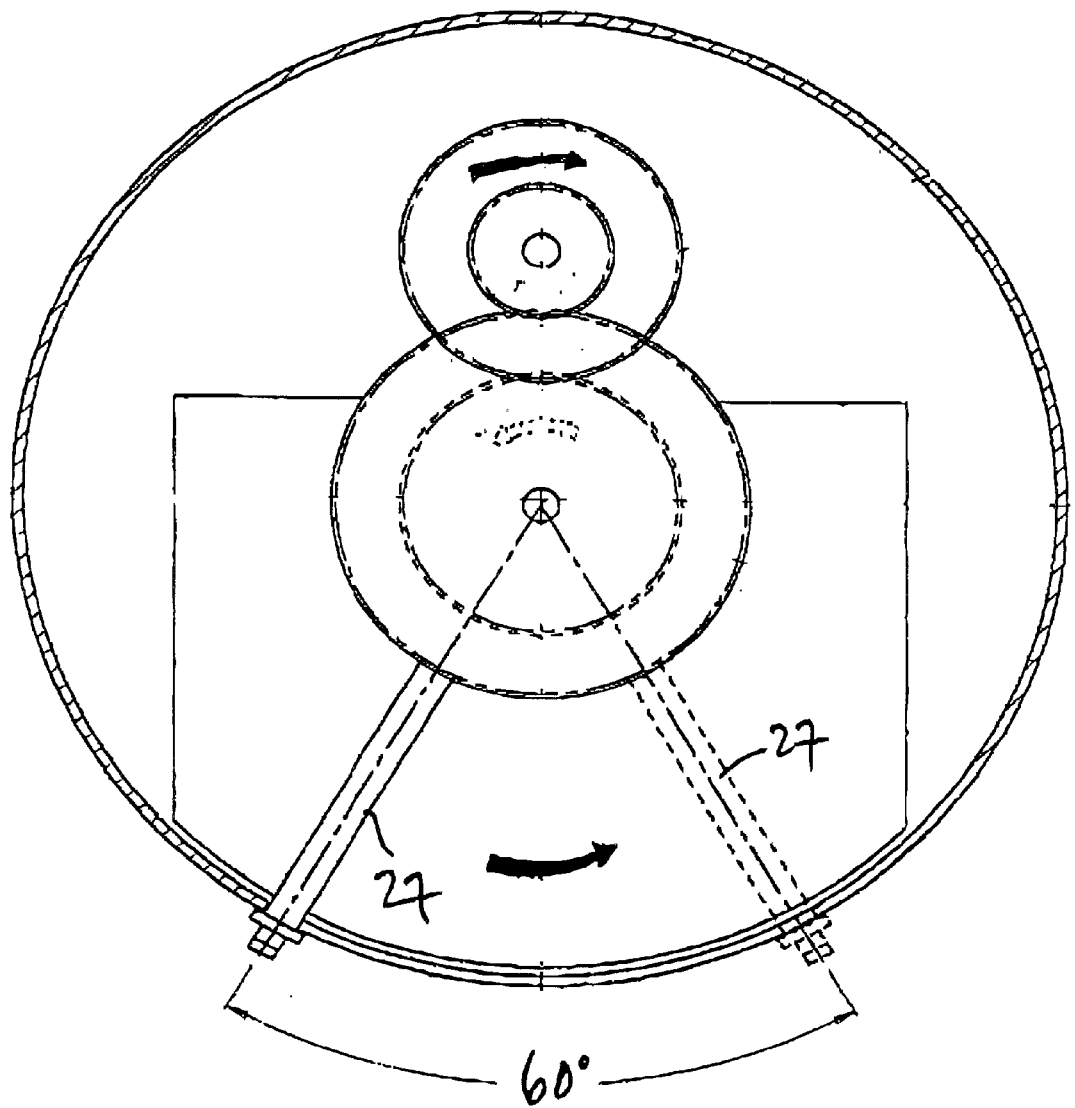
FIG. 7 is a diagrammatic view of other gears for the coffee maker for manual operation.

In FIG. 7, a set of gears 28 is shown for manually rotating the platform 10. The gears are arranged so that a lever 27 protrudes out of a front of the coffee maker. A remote end of the lever lies adjacent the support frame 11 and extends through a slot (not shown) that is in a plane otherwise occupied by rotate switch 19. To rotate the platform 10 through 180° the gearing ratio is arranged such that a remote end of the level must be moved manually through a 60° arc.

I claim:

1. An under-the-cabinet coffee maker having principal components comprising a water reservoir, a filter holder and a carafe which are all confined within an effective periphery of and mounted on a horizontal platform and arranged such that these components can be accessible or removed horizontally with respects to the platform, and a support frame having a front side and arranged to be mounted to an underside of a cabinet for rotatably supporting the platform so that the coffee maker can be turned to allow a front access to the components in turn.

2. An under-the-cabinet coffee maker according to claim 1, including gears mechanically coupling the platform to the support frame.

3. An under-the-cabinet coffee maker according to claim 2, including an operating lever having a gear for engaging the gears arranged to rotate the platform relative to the support in one or other direction when level is manually swung through a horizontal arc to the left or to the right respectively.

4. An under-the-cabinet coffee maker according to claim 2, including an electric motor connected to the gears for turning the platform relative to the support frame.

5. An under-the-cabinet coffee maker according to claim 1, in which the platform has upstanding walls that partially surround the principle components.

6. An under-the-cabinet coffee maker according to claim 5, in which the platform is circular and the walls upstand from adjacent the periphery of the platform.

7. An under-the-cabinet coffee maker according to claim 6, including arcuate closure doors for closing off a carafe cavity when the coffee maker is not in use, in which the doors are arcuate and slidable around respective outsides of the walls.

8. An under-the-cabinet coffee maker according to claim 6, including a part-annular shaped reservoir that fits at one side of the platform and has base with an outer surface that corresponds generally to the peripheral shape of the platform where it is supported.

9. An under-the-cabinet coffee maker according to claim 4, including a manually operable switch for the motor that is mounted to an exposed part of the platform.

\* \* \* \* \*